(12) United States Patent
Quinn et al.

(10) Patent No.: US 8,713,299 B2
(45) Date of Patent: Apr. 29, 2014

(54) SYSTEM AND METHOD FOR CONFIGURING SOFTWARE APPLICATIONS IN A MOTOR VEHICLE

(75) Inventors: Michael J. Quinn, Troy, MI (US); Richard C. Vanitvelt, Metamora, MI (US); Anthony G. Lobaza, Bloomfield Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 498 days.

(21) Appl. No.: 13/026,933

(22) Filed: Feb. 14, 2011

(65) Prior Publication Data

US 2011/0225416 A1 Sep. 15, 2011

Related U.S. Application Data

(60) Provisional application No. 61/313,546, filed on Mar. 12, 2010.

(51) Int. Cl.
*G06F 15/177* (2006.01)
*G06F 1/24* (2006.01)
*G06F 9/24* (2006.01)

(52) U.S. Cl.
USPC .................. 713/100; 713/1; 713/2; 709/217; 709/218; 709/219; 701/1; 701/2; 701/36

(58) Field of Classification Search
None
See application file for complete search history.

(56) References Cited

U.S. PATENT DOCUMENTS

| | | | |
|---|---|---|---|
| 8,145,599 B2 * | 3/2012 | Pilgrim et al. | 707/621 |
| 2010/0005280 A1 * | 1/2010 | Wagner et al. | 713/1 |
| 2011/0162035 A1 * | 6/2011 | King et al. | 726/1 |
| 2011/0202591 A1 * | 8/2011 | Reis et al. | 709/203 |

* cited by examiner

*Primary Examiner* — Fahmida Rahman

(57) ABSTRACT

A system and method for allowing a user to select and manage software applications in their vehicle from any Internet enabled device and allows the user to remotely configure the content of each specific application from any Internet enabled device. Once the application has been configured via the internet enabled device, the user launches the application from the vehicle. Upon launching, the application dynamically retrieves the user's settings from the server and downloads any information or content necessary. In this manner, the application is personalized to the user's settings, without the user ever having to take any actions from within the vehicle, or to personalize the user's settings while the vehicle is in Park.

15 Claims, 3 Drawing Sheets

SYSTEM AND METHOD FOR CONFIGURING SOFTWARE APPLICATIONS IN A MOTOR VEHICLE

CROSS-REFERENCE TO RELATED APPLICATIONS

This application claims the benefit of U.S. Provisional Application No. 61/313,546, filed on Mar. 12, 2010. The disclosure of the above application is incorporated herein by reference.

FIELD

The present disclosure relates to a system and method of configuring software applications in a motor vehicle, and more particularly to a system and method of configuring software applications in a motor vehicle using any internet enabled device.

BACKGROUND

The statements in this section merely provide background information related to the present disclosure and may or may not constitute prior art.

Motor vehicles equipped with communication systems have the capability of communicating between various entities. For example, a vehicle communications system may communicate with a call center, another vehicle, an EMS service, and a land network such as the internet-infrastructure, a public switching telephone network, or any other telecommunications network. These communication systems are typically integrated with controls, audio systems, and interactive display devices to provide information to the user of the motor vehicle. The information may be communicated in the form of light displays on the instrument panel of the motor vehicle, calls made to the motor vehicle, or as information displayed on the interactive display device. This information may be functional in nature, such as GPS location, vehicle performance information, warning messages and/or instructions, etc., and in the form of entertainment information, such as music, audio books, movies, games, etc. In many cases, this information is generated by software applications and the information is communicated to the motor vehicle via the communication system. While these systems have performed well in the past, there is room in the art for a system and method of configuring software applications in a motor vehicle in order to personalize the motor vehicle via an internet enabled device in order to reduce distractions and allow a user of the motor vehicle to perform more time consuming and more intensive driver workload operations outside of the vehicle.

SUMMARY

The present invention allows a user to select and manage software applications in their vehicle from any Internet enabled device. The user can remotely configure the content of each specific application from any Internet enabled device. Once the application has been configured via the internet enabled device, the user launches the application from the vehicle. Upon launching, the application dynamically retrieves the user's settings from the server and downloads any information or content necessary. In this manner, the application is personalized to the user's settings, without the user ever having to take any actions from within the vehicle or personalizing the user's settings while in Park.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
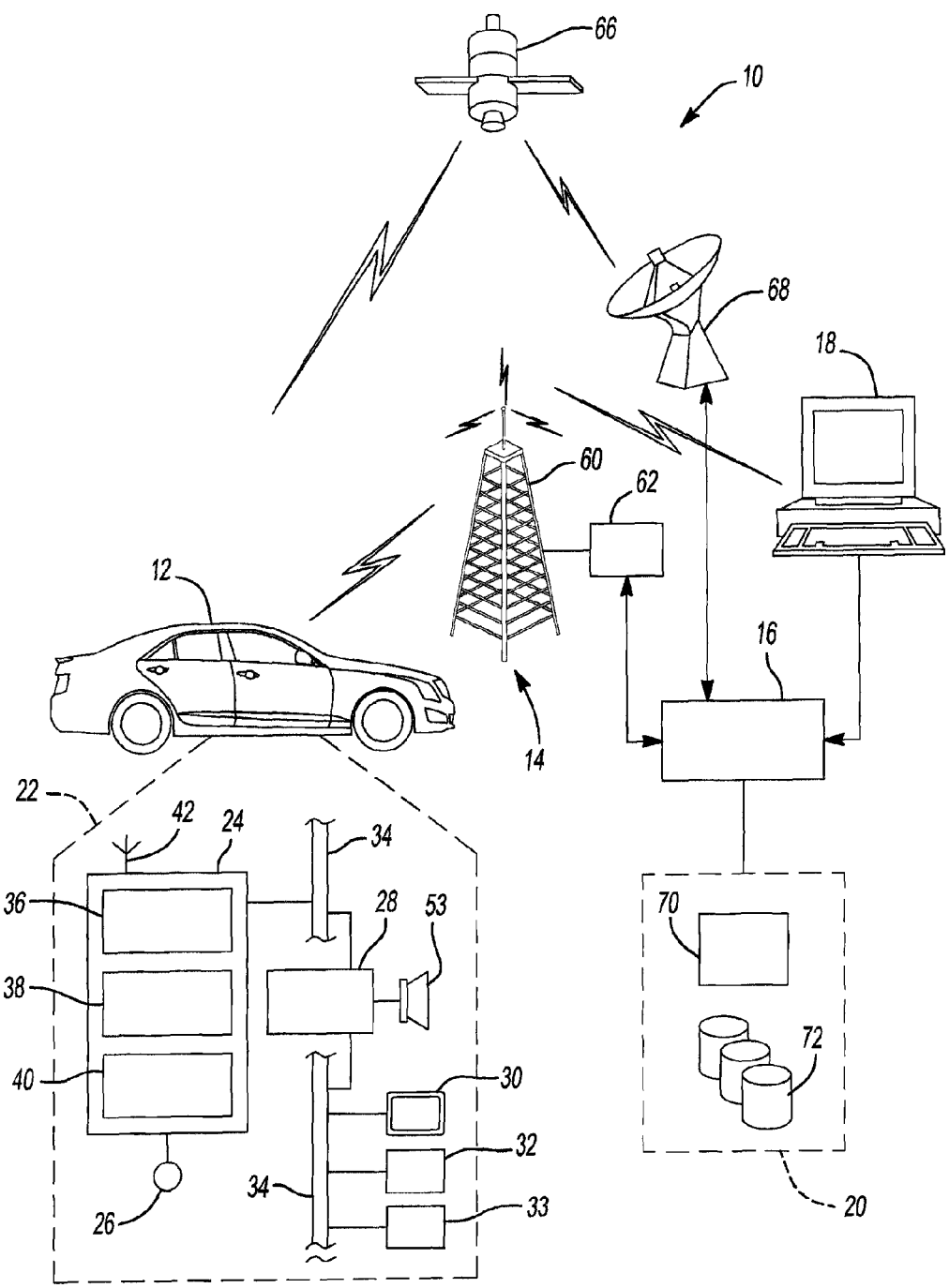
FIG. 1 is a schematic diagram of a system for selecting and communicating software applications to a motor vehicle according to the principles of the present invention.

Referring to FIG. 1, an exemplary system for configuring software applications in a motor vehicle is generally indicated by reference number 10. The system 10 generally includes a vehicle 12, one or more wireless carrier systems 14, a land communications network 16, an internet enabled device 18, and a vehicle service provider 20. It should be understood that the disclosed method can be used with any number of different systems and is not specifically limited to the operating environment shown here.

The vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The vehicle 12 includes a vehicle electronics system 22. The electronics system 22 generally includes a network module 24, one or more control inputs 26, an audio system 28, a visual display 30, an infotainment module 32, as well as a number of vehicle system modules (VSMs) 33. Some of these devices can be connected directly to the network module 24 such as, for example, the control inputs 26, whereas others are indirectly connected using one or more network connections, such as a communications bus 34. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

In the example provided, the network module 24 is a telematics unit which is an OEM-installed device that enables wireless voice and/or data communication over the wireless carrier system 14 and via wireless networking so that the vehicle can communicate with the vehicle service provider 20, other telematics-enabled vehicles, or some other entity or device. The network module 24 preferably uses radio transmissions to establish a communications channel (a voice channel and/or a data channel) with the wireless carrier system 14 so that voice and/or data transmissions can be sent and received over the channel. By providing both voice and data communication, network module 24 enables the vehicle to offer a number of different services including those related to navigation, telephony, emergency assistance, diagnostics, infotainment, etc. It should be appreciated that the network module 24 may be limited to data communication without departing from the scope of the present invention. Data can be sent either via a data connection, such as via packet data transmission over a data channel, or via a voice channel using techniques known in the art. It should be appreciated that the network unit 24 may be a wi-fi connection or a Bluetooth connection without departing from the scope of the present invention.

The network module 24 can be used to provide a diverse range of vehicle services that involve wireless communication to and/or from the vehicle 12. Such services include: turn-by-turn directions and other navigation-related services that are provided in conjunction with a GPS-based vehicle navigation module; airbag deployment notification and other emergency or roadside assistance-related services that are provided in connection with one or more collision sensor interface modules such as a body control module (not shown); diagnostic reporting using one or more diagnostic modules; and infotainment-related services for the infotainment module 32. It should be understood that at least some of the aforementioned modules could be implemented in the form of software instructions saved internal or external to the network module 24, implemented as hardware components located internal or external to the network module 24, or integrated and/or shared with each other or with other systems located throughout the vehicle. In the event that the modules are implemented as VSMs 33 located external to the telematics unit 32, they could utilize the vehicle bus 34 to exchange data and commands with the network module 24 and the infotainment module 32.

According to one embodiment, the network module 24 utilizes cellular communication according to either GSM or CDMA standards and thus includes a standard cellular chipset 36 for voice communications like hands-free calling, a wireless modem for data transmission, an electronic processing device 38, one or more digital memory devices 40, and a dual antenna 42. It should be appreciated that the modem can either be implemented through software that is stored in the network module 24 and is executed by the processor 38, or it can be a separate hardware component located internal or external to the network module 24. The modem can operate using any number of different standards or protocols such as EVDO, CDMA, GPRS, and EDGE. Wireless networking between the vehicle and other networked devices can also be carried out using the network module 24. For this purpose, the network module 24 can be configured to communicate wirelessly according to one or more wireless protocols, such as any of the IEEE 802.11 protocols, WiMAX, or Bluetooth. When used for packet-switch data communication such as TCP/IP, the network module 24 can be configured with a static IP address or can set up to automatically receive an assigned IP address from another device on the network such as a router or from a network address server.

The processor 38 can be any type of device capable of processing electronic instructions including microprocessors, microcontrollers, host processors, controllers, vehicle communication processors, and application specific integrated circuits (ASICs). It can be a dedicated processor used only for the network module 24 or can be shared with other vehicle systems.

Figure 2:
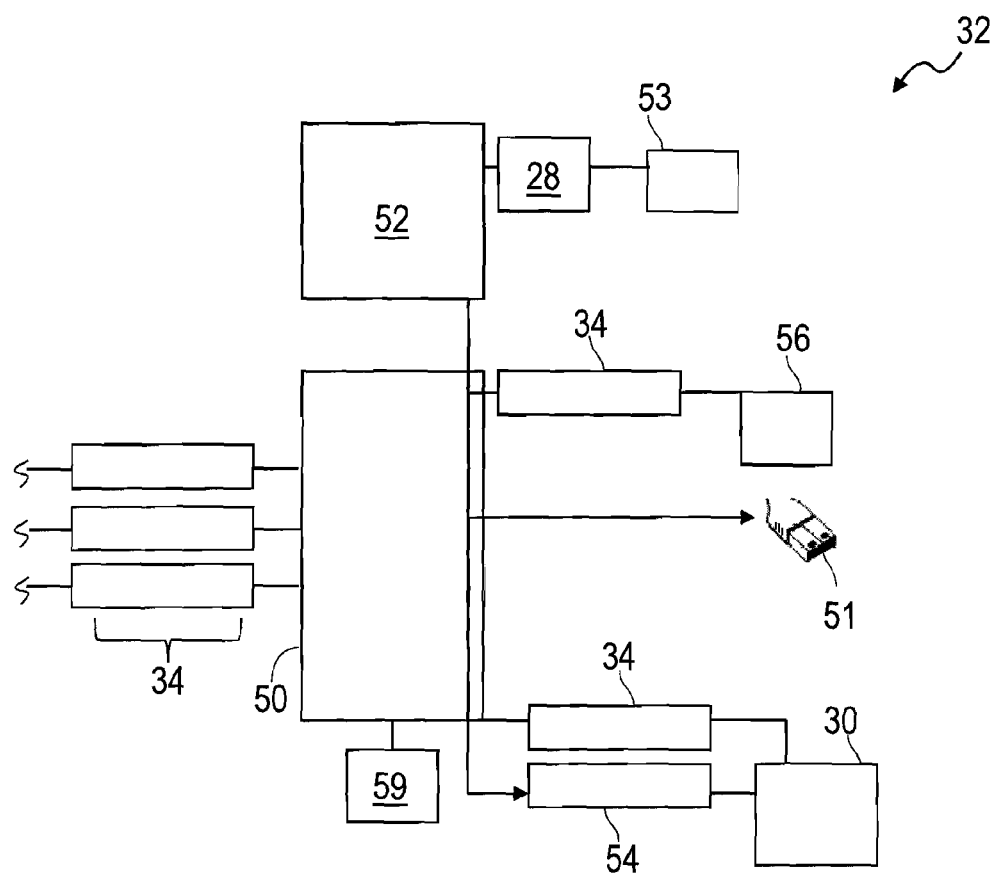
FIG. 2 is a schematic diagram of an exemplary infotainment module within the motor vehicle.

Turning to FIG. 2, the infotainment module 32 is illustrated in further detail. The infotainment module 32 offers AM/FM or satellite radio, DC/DVD player for music and video, navigation system, data and multi-media ports (USB, Bluetooth, line in, line out, video in) as well as general and vehicle status information. The infotainment module 32 can also display webpages, movies, television programs, videogames and/or other information that is downloaded by the infotainment module 32 via the network module 24.

The infotainment module 32 generally includes a processor 50 in communication with the network module 24 via the network bus 34. The processor 50 can be any type of device capable of processing electronic instructions including microprocessors, microcontrollers, host processors, controllers, vehicle communication processors, digital signature processing, and application specific integrated circuits (ASICs). Generally, the processor 50 controls the user interface, bus interface, and network interface as well as GPS navigation and touch screen control. It is also used to process and output video data from multiple sources. The processor 50 can have various input and output (I/O) ports that allow a user of the motor vehicle 12 to connect with the infotainment module 32. For example, the processor 50 can communicate with a USB device 51. Processor 50 may be connected to additional memory or additional device 59.

The processor 50 communicates with an audio processor 52. The audio processor 52 performs I/Q demodulation and outputs digital audio and data. This data includes functions such as volume, treble, bass and sound effects, as well as more sophisticated features like mixing input channels and digitally process multiple channels, performing sound effects processing such as Dolby® Pro Logic® II, SRS® Circle Surround™ II, TruSound and other audio algorithms. The audio processor 52 outputs to the audio system 28 that includes a plurality of speakers 53.

The processor 50 also communicates via the network bus 34 with the display device 30. In the example provided, the display device 30 is an interactive display device that is preferably a graphics display, such as a touch screen on the instrument panel or a heads-up display reflected off of the windshield, and can be used to provide a multitude of input and output functions. The display device 30 is preferably controlled via touchscreen input controls 54, though various other input controls may be used to control the infotainment module 32, such as input controls 26 associated with the network module 24. In one embodiment, the input controls 26 and 54 are combined or integrated on the instrument panel of the motor vehicle or through the touchscreen of the display device 30. It should be appreciated that various other vehicle user interfaces and display devices can also be utilized. For example, the processor 50 may also communicate via the network bus 34 with a separate monitor or other display device 56, either in a service station or an integrated video display located in a back seat area of the motor vehicle 12.

Returning to FIG. 1, apart from the infotainment module 32, the vehicle 12 can include other vehicle system modules (VSMs) 33 in the form of electronic hardware components that are located throughout the vehicle and typically receive input from one or more sensors and use the sensed input to perform diagnostic, monitoring, control, reporting and/or other functions. Each of the VSMs 33 is preferably connected by communications bus 34 to the other VSMs, as well as to the network module 24 and the infotainment module 32, and can be programmed to run vehicle system and subsystem diagnostic tests. As examples, one VSM 33 can be an engine control module (ECM) that controls various aspects of engine operation such as fuel ignition and ignition timing, another VSM 33 can be a powertrain control module that regulates operation of one or more components of the vehicle powertrain, and another VSM 33 can be a body control module that governs various electrical components located throughout the vehicle, like the vehicle's power door locks and headlights. It should be appreciated that the above-mentioned VSMs are only examples of some of the modules that may be used in vehicle 12, as numerous others are also possible.

The wireless carrier system 14 is preferably a cellular telephone system that includes a plurality of cell towers 60 (only one shown), one or more mobile switching centers (MSCs) 62, as well as any other networking components required to connect the wireless carrier system 14 with the land network 16. Cellular system 14 can implement any suitable communications technology, including for example, analog technologies such as AMPS, or the newer digital technologies such as CDMA (e.g., CDMA2000) or GSM/GPRS.

The wireless carrier system 14 may also include satellite based communications which can be used to provide unidirectional or bi-directional communication with the vehicle 12. This can be done using one or more communication satellites 66 and an uplink transmitting station 68. Uni-directional communication can be, for example, satellite radio services, wherein programming content (news, music, etc.) is received by transmitting station 68, packaged for upload, and then sent to the satellite 66, which broadcasts the programming to subscribers. Bi-directional communication can be, for example, satellite telephony services using satellite 66 to relay telephone communications between the vehicle 12 and the station 68. It should be appreciated that the wireless carrier system 14 is only exemplary and may include any other number of telecommunications systems and methods.

The land network 16 may be a conventional land-based telecommunications network that is connected to one or more landline telephones and connects the wireless carrier system 14 to the vehicle service provider 20 and the computer 18. For example, the land network 16 may include a public switched telephone network (PSTN) such as that used to provide hardwired telephony, packet-switched data communications, and preferably the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, the vehicle service provider 20 and computer 18 need not be connected via the land network 16, but could include wireless equipment so that it can communicate directly with a wireless network, such as the wireless carrier system 14.

The internet enabled device 18 can be one of a number of devices capable of accessing the internet, such as, for example, home personal computers, laptop computers, notebook or netbook computers, PDA's, phones, smart phones, etc.

The service provider 20 is designed to provide the vehicle electronics 22 with a number of different system back-end functions. These functions include providing software applications to the infotainment module 32 of the vehicle 12. Other functions may include diagnostic information, warning communications, etc. The vehicle service provider 20 can have various configurations but generally includes servers 70 and databases 72 that communicate with the land network 16 to provide software applications and other services. Data transmissions to and from the land network 16 are passed to the servers 70 and/or databases 72. The servers 70 can store various software applications. The databases 72 can store account information such as subscriber authentication information, vehicle identifiers, profile records, behavioral patterns, and other pertinent subscriber information.

Figure 3:
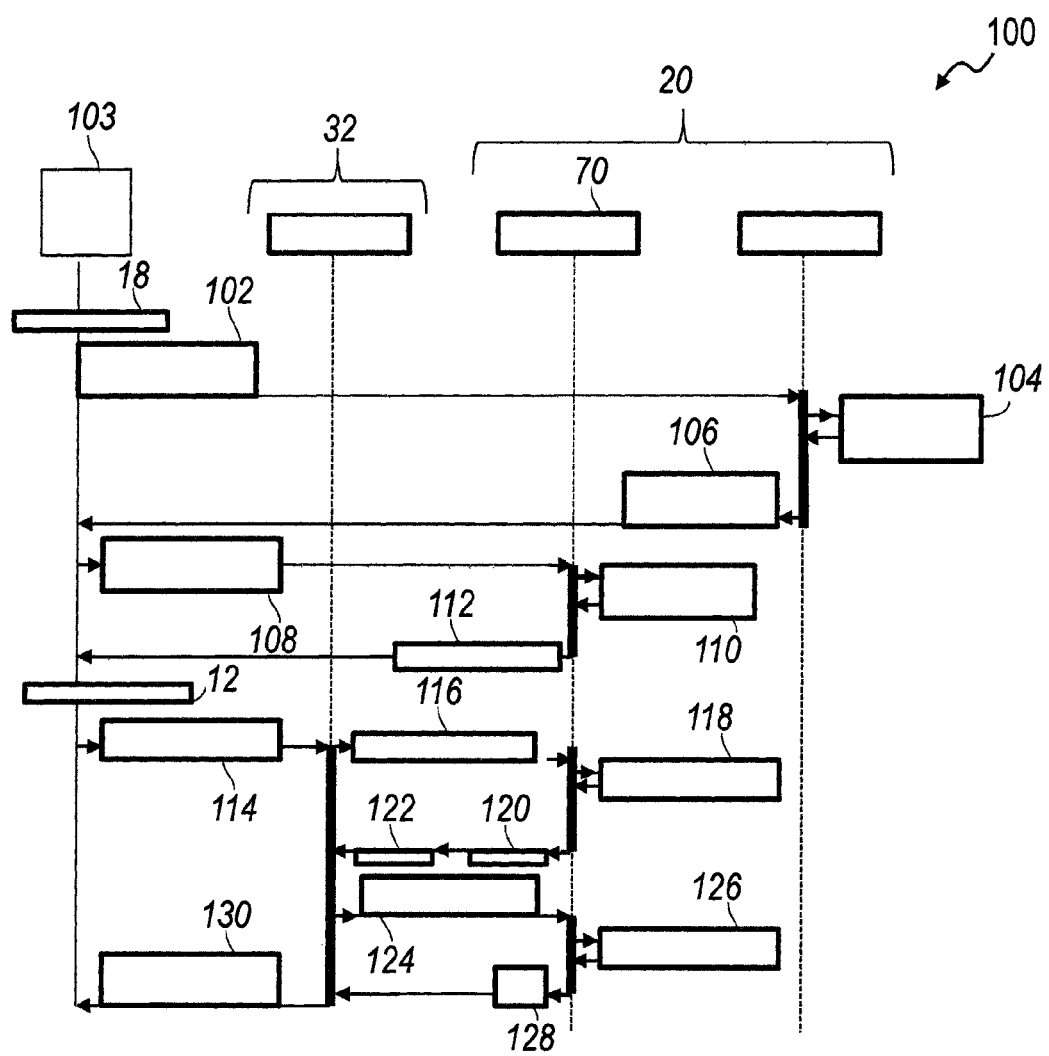
FIG. 3 is a flowchart illustrating an embodiment of a method for selecting, communicating, and storing software applications to a motor vehicle according to the principles of the present invention.

Turning now to FIG. 3, and with continued reference to FIGS. 1 and 2, a method of configuring software applications using the system 10 is generally indicated by reference number 100. The method 100 begins at step 102 where a user 103 uses the device 18 to access the servers 70 of the vehicle service provider 20 via the internet 16 to select to configure a software application previously stored or used by the vehicle 12. The software applications can take any form, from website content such as sports news internet pages and news internet pages, to diagnostic applications, to games, to content players, to name but a few. The vehicle service provider 20 receives the request and retrieves the URL of the configuration page for the requested application at step 104. At step 106, the application configuration URL is opened and communicated to the device 18. The user 103 then sets the application configuration options using the device 18 at step 108. For example, where the application is a sports news application, the user 103 can select specific teams or sports that the user 103 prefers to read about, or prefer to see updated information about. In a news application the user 103 can select the news sources that they would like to read or the user 103 can type in a URL that is not included in any pre-defined list from the vehicle service provider 20.

The application settings are then communicated back to the servers 70 of the vehicle service provider 20 and the vehicle service provider 20 updates the application configuration for the user 103 at step 110. The vehicle service provider 20 then sends a confirmation of the configuration settings at step 112.

Once the user 103 is within the vehicle 12, the user 103 launches the application using the infotainment module 32 at step 114. At step 116 the application then sends a request to receive configuration settings through the infotainment module 32 and the network module 24 to the vehicle service provider 20. At step 118 the vehicle service provider 20 looks up the application configuration settings previously set and stored at step 110. The configuration options are then communicated back to the infotainment module 32 via the network module 24 at step 120. The infotainment module 32 then updates and configures the application according to the received configuration settings at step 122. If no dynamic content is associated with the updated settings, then the method 100 proceeds to step 130. If, however, the configuration settings require dynamic content, then the method 100 proceeds to step 124 where the infotainment module 32 requests from the vehicle service provider 20 the dynamic content associated with the configuration settings. Examples of dynamic content include, but are not limited to, sports scores or updated news items and webpages (i.e. content that changes over time). The vehicle service provider 20 retrieves the requested content at step 126 and communicates the requested content back to the infotainment module 32 at step 128. The method 100 ends with the user 103 presented with the content selected through the internet enabled device 18 without further in-vehicle operations.

The system 10 and method 100 allows applications to be personalized to the preferences of each individual user 103 of a vehicle 12. In addition, the system 10 and method 100 allows the user 103 to perform more time consuming and more intensive driver workload operations outside of the vehicle 12. This allows for safer operation of the vehicle 12 without sacrificing personalization features and provides a more usable platform to configure the applications within the vehicle 12.

The description of the invention is merely exemplary in nature and variations that do not depart from the gist of the invention are intended to be within the scope of the invention.

Such variations are not to be regarded as a departure from the spirit and scope of the invention.

The following is claimed:

1. A method for configuring software applications for use in a motor vehicle, the method comprising:
   selecting a software application stored in the motor vehicle from a vehicle service provider using a device separate from the motor vehicle;
   communicating a configuration Uniform Resource Locator (URL) from the vehicle service provider to the device;
   configuring the software application using the configuration URL on the device;
   communicating the configuration of the software application from the device to the vehicle service provider;
   updating the software application with the configuration;
   starting the software application using a module of the motor vehicle;
   sending a request from the motor vehicle to the vehicle service provider requesting the configuration of the software application;
   sending the configuration of the software application to the motor vehicle;
   configuring the software application stored in the motor vehicle using the configuration of the software application sent by the service provider;
   requesting dynamic content from the module of the motor vehicle to the service provider;
   retrieving the dynamic content using the service provider, and
   communicating the dynamic content from the vehicle service provider to the module of the motor vehicle.

2. The method of claim 1 further comprising sending a feedback message from the vehicle service provider to the device confirming that the software application has been updated with the configuration.

3. The method of claim 1 wherein the step of sending a request from the motor vehicle to the vehicle service provider requesting the configuration of the software application occurs automatically after starting the motor vehicle.

4. The method of claim 1 wherein the step of starting the software application using a module of the motor vehicle includes starting the software application using an infotainment module having a screen in the motor vehicle.

5. The method of claim 1 wherein the steps of communicating a configuration Uniform Resource Locator (URL) from the vehicle service provider to the device and communicating the software application configuration from the device to the vehicle service provider includes communicating via the Internet.

6. The method of claim 1 wherein the step of configuring the software application using the configuration URL on the device includes displaying the configuration URL on a screen of the device.

7. The method of claim 1 further comprising the step of a user logging into the vehicle service provider using the device and linking the configuration of the software application with the user.

8. A method for configuring software applications for use in a motor vehicle, the method comprising:
   selecting a software application stored in the motor vehicle from a vehicle service provider using a device separate from the motor vehicle;
   communicating a configuration Uniform Resource Locator (URL) from the vehicle service provider to the device;
   configuring the software application using the configuration URL on the device;
   communicating the configuration of the software application from the device to the vehicle service provider;
   updating the software application with the configuration;
   starting the software application using a module of the motor vehicle;
   sending a request from the motor vehicle to the vehicle service provider requesting the configuration of the software application;
   sending the configuration of the software application to the motor vehicle;
   configuring the software application stored in the motor vehicle using the configuration of the software application sent by the service provider;
   requesting dynamic content from the module of the motor vehicle to the service provider;
   retrieving the dynamic content using the service provider; and
   communicating the dynamic content from the vehicle service provider to the module of the motor vehicle.

9. The method of claim 8 further comprising sending a feedback message from the vehicle service provider to the device confirming that the software application has been updated with the configuration.

10. The method of claim 8 wherein the step of sending a request from the motor vehicle to the vehicle service provider requesting the configuration of the software application occurs automatically after starting the motor vehicle.

11. The method of claim 8 wherein the step of starting the software application using a module of the motor vehicle includes starting the software application using an infotainment module having a screen in the motor vehicle.

12. The method of claim 8 wherein the steps of communicating a configuration Uniform Resource Locator (URL) from the vehicle service provider to the device and communicating the software application configuration from the device to the vehicle service provider includes communicating via the Internet.

13. The method of claim 8 wherein the step of configuring the software application using the configuration URL on the device includes displaying the configuration URL on a screen of the device.

14. The method of claim 8 further comprising the step of a user logging into the vehicle service provider using the device and linking the configuration of the software application with the user.

15. A method for configuring the content of software applications for use in a motor vehicle, the method comprising:
   selecting a software application stored in the motor vehicle from a vehicle service provider using a device separate from the motor vehicle and separate from the vehicle service provider;
   communicating a configuration Uniform Resource Locator (URL) from the vehicle service provider to the device;
   configuring the content of the software application using the configuration URL on the device from the available options;
   communicating the configuration of the content of the software application from the device to the vehicle service provider;
   updating the content of the software application with the configuration;
   starting the software application using a module of the motor vehicle;

sending a request from the motor vehicle to the vehicle service provider requesting the configuration of the content of the software application;

sending the configuration of the content of the software application to the motor vehicle;

configuring the content of the software application stored in the motor vehicle using the configuration of the content of the software application sent by the service provider;

requesting dynamic content from the module of the motor vehicle to the service provider;

retrieving the dynamic content using the service provider, and communicating the dynamic content from the vehicle service provider to the module of the motor vehicle.

* * * * *